US006868062B1

(12) United States Patent
Yadav et al.

(10) Patent No.: US 6,868,062 B1
(45) Date of Patent: Mar. 15, 2005

(54) MANAGING DATA TRAFFIC ON MULTIPLE PORTS

(75) Inventors: Satyendra Yadav, Portland, OR (US); Puqi Tang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/536,968

(22) Filed: Mar. 28, 2000

(51) Int. Cl.$^7$ .............................................. G01R 31/08
(52) U.S. Cl. ..................................... 370/234; 370/231
(58) Field of Search ................................ 370/230, 231, 370/233, 234, 235, 235.1, 252, 253, 29, 30, 30.1, 232

(56) References Cited

U.S. PATENT DOCUMENTS

| | | | | |
|---|---|---|---|---|
| 5,274,625 | A | * 12/1993 | Derby et al. | ................. 370/233 |
| 5,815,492 | A | * 9/1998 | Berthaud et al. | ........... 370/234 |
| 5,867,483 | A | * 2/1999 | Ennis et al. | ................. 370/252 |
| 6,393,483 | B1 | * 5/2002 | Latif et al. | .................. 709/226 |

OTHER PUBLICATIONS

Perry Tang, "The Interface Specification of Measurement-based Traffic Specifier (MBTS)," Nov. 24, 1997.
Perry Tang et al., "Network Traffic Characterization Using Token Bucket Model," Mar. 21, 1999, Infocom '99, Mar. 21–25, 1999, Sheraton Hotel, New York, NY.
Perry Tang and Charlie Tai, "Network Traffic Characterization Using Token Bucket Model," Mar. 21, 1999, slide presentation at Infocom '99, Mar. 21–25, 1999, Sheraton Hotel, New York, NY.
RSVP graduation report by Bart Bokhorst at http://www.phys.uu.nl/~wwwfi/rsvp/public_html_bokhorst/option1/part1.html (Mar. 24, 2000).
Intel Network Technologies: Load Balancing, at http://www.intel.com.au/network/technologies/load_balancing.htm (Mar. 24, 2000).
Solving Server Bottlenecks: Adaptive Load Balancing, at http://www.intel.com.au/network/solutions/server_bottlenecks/bot_soll.htm (Mar. 24, 2000).
Traffic and Application Classification at http://network-services.uoregon.edu/~ursula/thesis/node9.html (Jun. 14, 1997).
Torsten Braun, "Internet Protocols for Multimedia Communications, Part II: Resource Reservation, Transport, and Application Protocols," IEEE Multimedia, vol. 4, No. 4: Oct.–Dec. 1997, pp. 74–82.

* cited by examiner

*Primary Examiner*—Steven Nguyen
*Assistant Examiner*—Thien Tran
(74) *Attorney, Agent, or Firm*—Fish & Richardson P.C.

(57) ABSTRACT

A traffic pattern of data packets that originate at a traffic source and are transmitted through one of multiple ports is monitored. A parameter value characterizing fluctuations a in a transmission rate of data through the port relative to a transmission rate for the monitored traffic pattern is generated, and data packets from the traffic source are allocated to at least one other port for transmission based on the first parameter value.

20 Claims, 5 Drawing Sheets

MANAGING DATA TRAFFIC ON MULTIPLE PORTS

BACKGROUND

The invention relates to managing data traffic on multiple ports.

Data traffic sources, such as servers, are typically connected to a network by one or more input/output ports or network adapters, such as network interface cards (NICs). Bottlenecks or failures of a traffic source that reduce its data output rate can hamper the productivity of users of the network.

Multiple network adapters may be installed on the server to share the data traffic load using so-called adaptive load balancing (ALB) or asymmetric port aggregation. Incoming data traffic may be received over one network adapter while the flow of outgoing data traffic is balanced across multiple network adapters so that the data output rate of the server is not limited by the capacity of a single network adapter. If a failure or bottleneck develops on one network adapter, data traffic may be re-routed to the others. For example, server with four network adapters may output data at four times the rate it could with only one adapter, assuming that data traffic is evenly distributed among the four network adapters. If, however, one of the four adapters carries half the data traffic, then the server's output rate is improved by a factor of only two.

Current ALB techniques monitor the average traffic flow rate of data packets from the server when balancing data traffic among multiple network adapters. Both the size of data packets (in bytes) and the time interval between the transmission of consecutive data packets varies. The existence of non-steady traffic rates, traffic bursts, and the variability of packet sizes also must be considered to achieve optimal load balancing.

DETAILED DESCRIPTION

Figure 1:
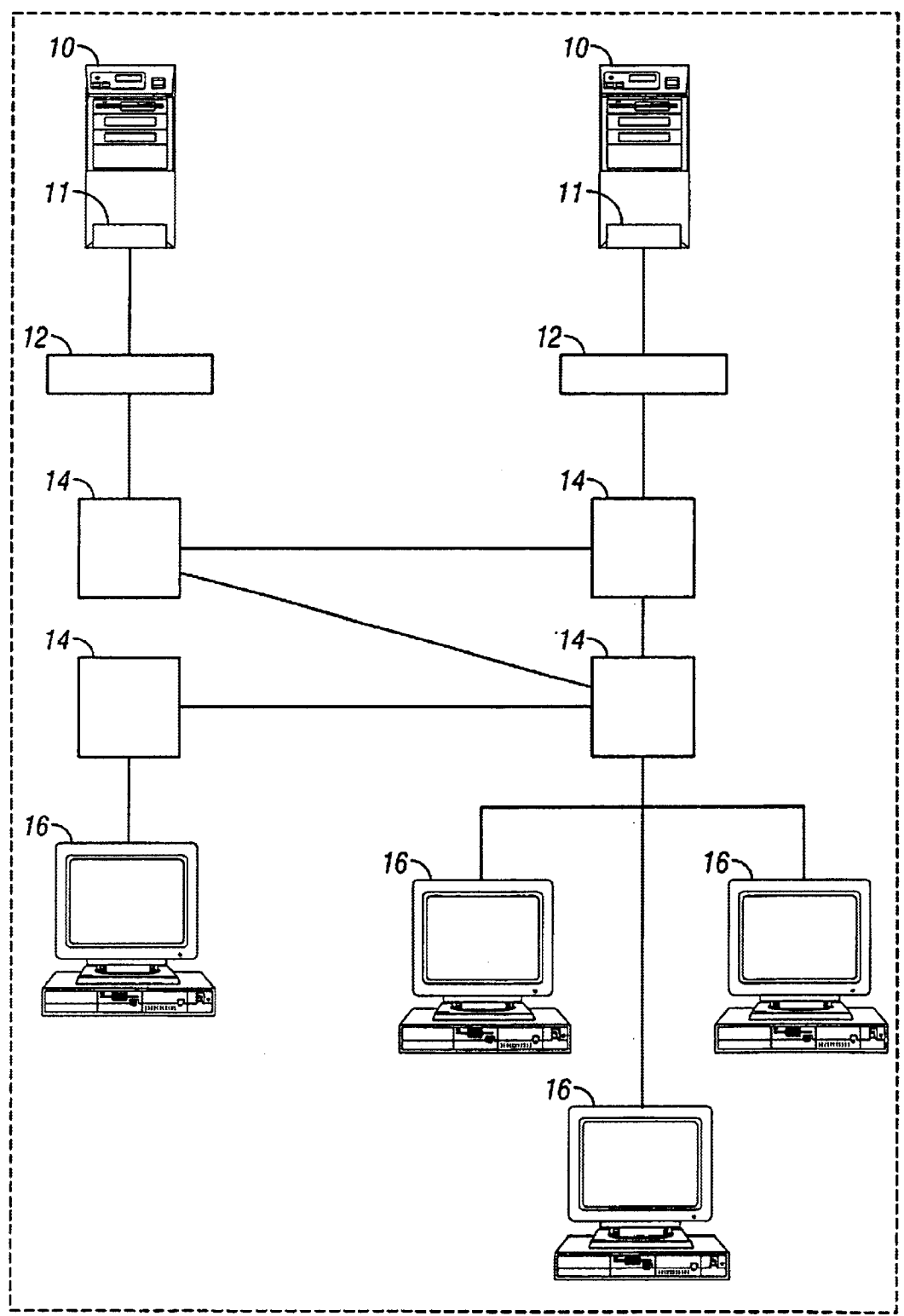
FIG. 1 shows a computer network.

Referring to FIG. 1, a computer network 2 may include one or more computers acting as servers 10 connected through switches 12 and routers 14 to one or more computers acting as clients 16. Servers 10 can be connected to switches 12 through one or more input/output ports or network adapters 11, such as network interface cards (NICs), through which data are transmitted to and from a server 10.

Figure 2A:
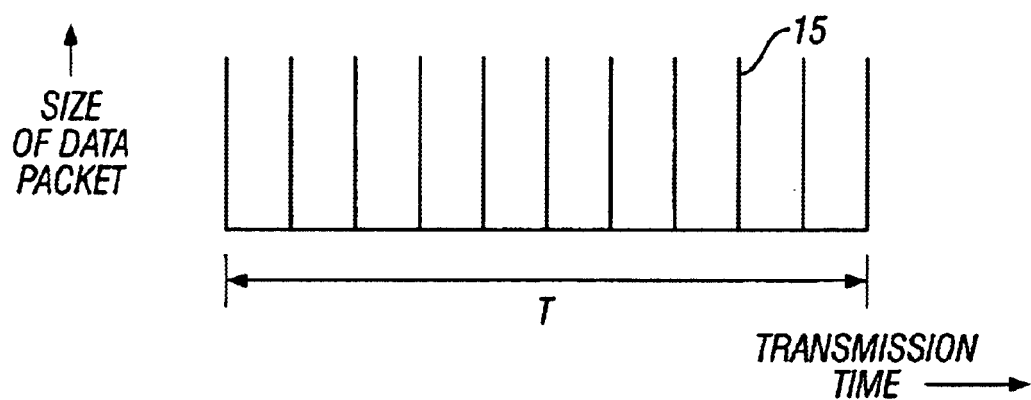
FIGS. 2A and 2B show traffic patterns of data packets.
Figure 2B:
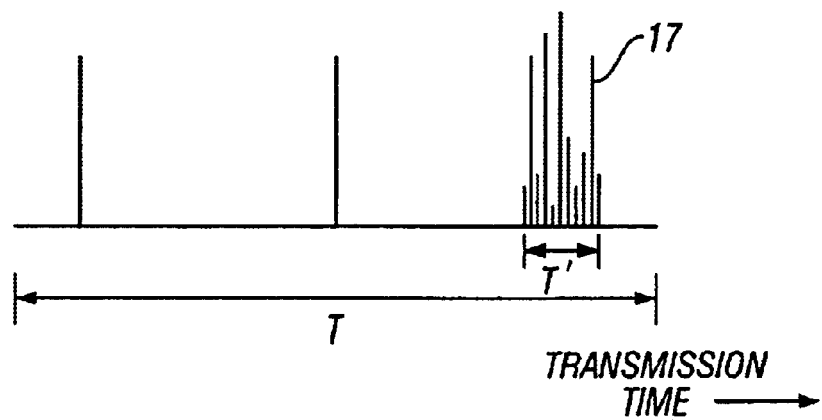

Data can be transmitted in the form of data packets, which may contain a variable number of data bytes and which may be transmitted at irregular time intervals. During a time of high traffic, a burst of large packets may be sent in a short period of time, subject to the transmission capacity limit of network adapter 11. Alternatively, relatively few small packets may be sent during a period of low traffic. In FIG. 2A, for example, equal size data packets 15 are transmitted at equal time intervals in a time period T. In FIG. 2B, the total volume of data transmitted in time period T is identical to that in FIG. 2A, even though data packets 17 of variable size are transmitted at irregular time intervals, including one large-volume, short-term burst of data packets during time interval T', which is shorter than T. The average data transmission rate in time period T is identical in FIGS. 2A and 2B, but the fluctuations in the transmission rate about the average are greater in FIG. 2B than in FIG. 2A. Also, although the data transmission rates over time interval T are identical in FIGS. 2A and 2B, the data packet transmission rates are different, because 11 data packets are transmitted in FIG. 2A and 9 data packets are transmitted in FIG. 2B during the same time interval, T.

Figure 3:
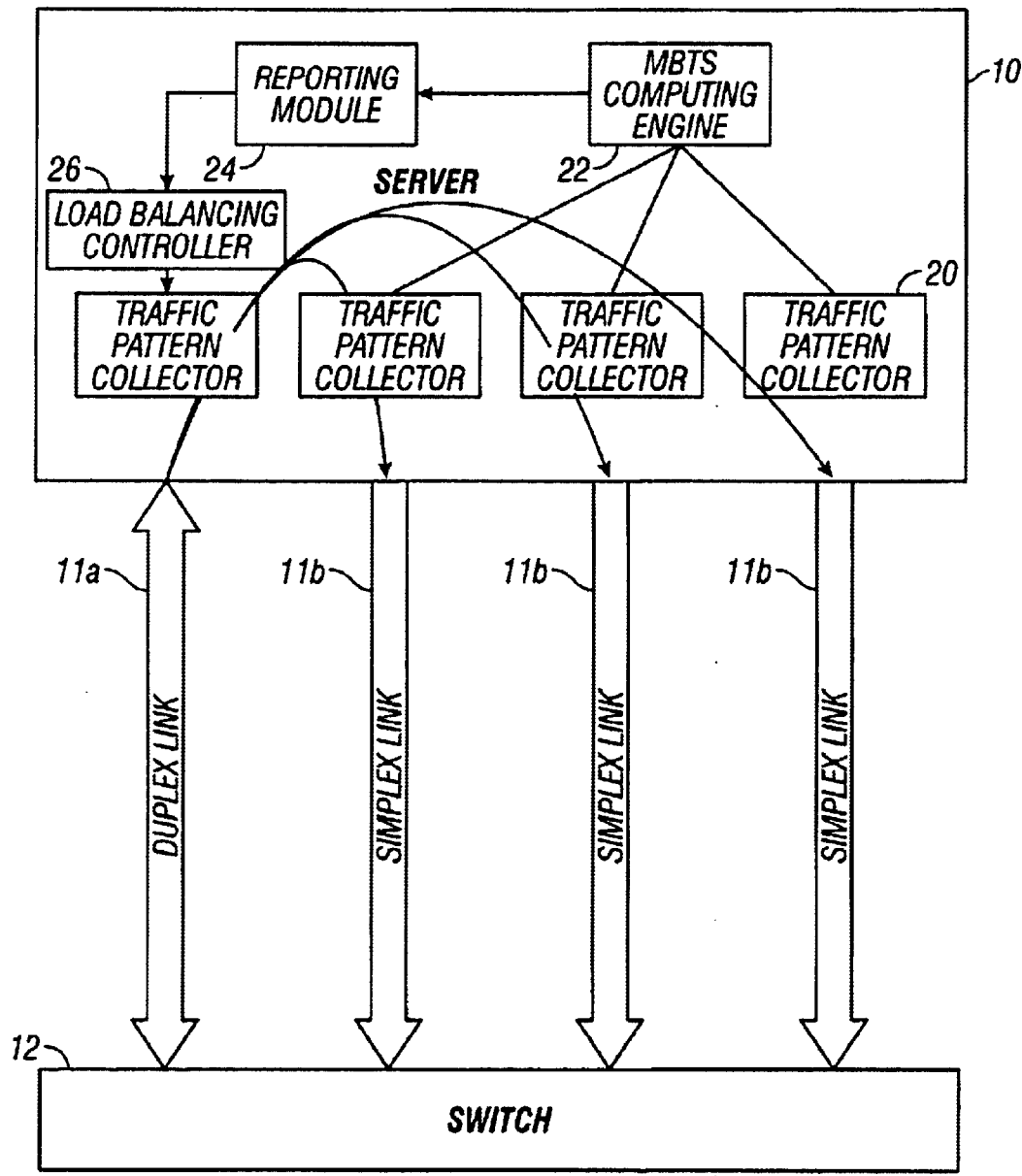
FIG. 3 shows a server computer connected to a switch by multiple network adapters according to an implementation of the invention.

Referring to FIG. 3, data can be transmitted between a server 10 and a switch 12 over either a duplex link network adapter 11a or simplex link network adapters 11b. Duplex link network adapter 11a transmits data both to and from a server while simplex link network adapters 11b only transmit outgoing data from server 10. Since servers generally send more data than they receive, more capacity is needed for outgoing data traffic than for incoming traffic. At least one network adapter 11 transmitting data to server 10 is necessary, however, so that client computers 16 may send requests for data to server 10.

As outgoing data packets are transmitted from server 10 over network adapters 11, the pattern of data traffic (e.g. sizes of data packets and times at which they are transmitted) over an individual network adapter 11 may be monitored by a traffic pattern collector (TPC) 20. A single TPC 20 may be dedicated to a single network adapter 11, or data traffic from multiple network adapters 11 may be multiplexed on one TPC 20 so that a single TPC may monitor the data traffic patterns on multiple network adapters 11.

Data traffic pattern information collected by TPCs 20 is sent to a measurement-based traffic specification (MBTS) computing engine 22 where it is analyzed and characterized. Traffic patterns are characterized by the average data transmission rate and by the size of fluctuations about the average transmission rate (i.e., the size of short-time-period bursts of data) occurring in the traffic pattern. The long-term and short-term characteristics of a traffic pattern may be parameterized using a variety of models including, for example, a token bucket model.

The token bucket model parameterizes the monitored traffic pattern in terms of a token bucket size b (in bytes) and a token generation rate (in bytes per second) that would be required to carry the traffic flow without dropping any data packets. In the token bucket model it is imagined that a bucket is filled with tokens at a rate r and that the bucket can hold a maximum of b bytes. The token bucket size b and fill rate r are variable, but have upper bounds of B and R, respectively.

Whenever a data packet of size x is transmitted from server 10 over a network adapter 11, it is imagined that x tokens are removed from the token bucket. A data packet can be successfully sent if the number of tokens in the bucket exceeds the size of the data packet to be sent. Thus, during a time period T, no more than $(r*T)+b$ data bytes can be successfully sent. Choosing values of r and b necessary to accommodate a monitored traffic flow characterizes the long-term average rate of the flow (in terms of r, since $(r*T)+b$ is dominated by the first term for large values of T) and the short-term burstiness of the flow (in terms of b, since (r*T)+b is dominated by b as T goes to zero). For a real data traffic pattern, the token bucket generation rate r represents the processing power consumed by the traffic pattern, while the bucket size b represents the memory space consumed by the traffic pattern. Many different combinations (r, b) exist to characterize a particular monitored traffic flow. A combination can be chosen to minimize consumption of total system resources. The MBTS computing engine 22 characterizes the traffic flow over a network adapter 11 using values of (r, b) that would minimize the consumption of system resources and generates information about the average rate and burstiness of a data traffic pattern on a particular network adapter 11.

Information about the average rate and burstiness of traffic patterns on the different network adapters 11 is forwarded from MBTS computing engine 22 to a reporting module 24. Reporting module 24 compares token bucket parameters generated by MBTS computing engine 22 with threshold values of the parameters that should not be exceeded if system resources are to be efficiently utilized and if server 10 is to transmit data packets with minimal loss and delay. Threshold parameters may be permanently set in server 10 or set by the user. If a token bucket parameter generated by MBTS computing engine 22 exceeds a threshold parameter, then reporting module 24 recognizes that either the burstiness or the average rate of data transmission on a network adapter 11 is too high and that the traffic flow is approaching the maximum traffic flow on the network adapter 11 that may be accommodated by available system resources. This can cause a critical condition. A critical condition may result when either the average data transmission rate or the short-term burstiness is too high. When a critical condition occurs, reporting module 24 reports the condition to load balancing controller 26.

When load balancing controller 26 is notified of a critical condition on a network adapter 11, it causes server 10 to alter the flow of future data traffic on the affected network adapter 11 by an amount sufficient to eliminate the critical condition. Server 10 re-routes data traffic from the network adapter 11 with the critical condition onto other network adapters 11 that have capacity available to handle additional data traffic. Thus, the outgoing data traffic load from server 10 can be balanced across the team of network adapters 11 such that the capacity of all network adapters 11 may be efficiently utilized.

Figure 4:
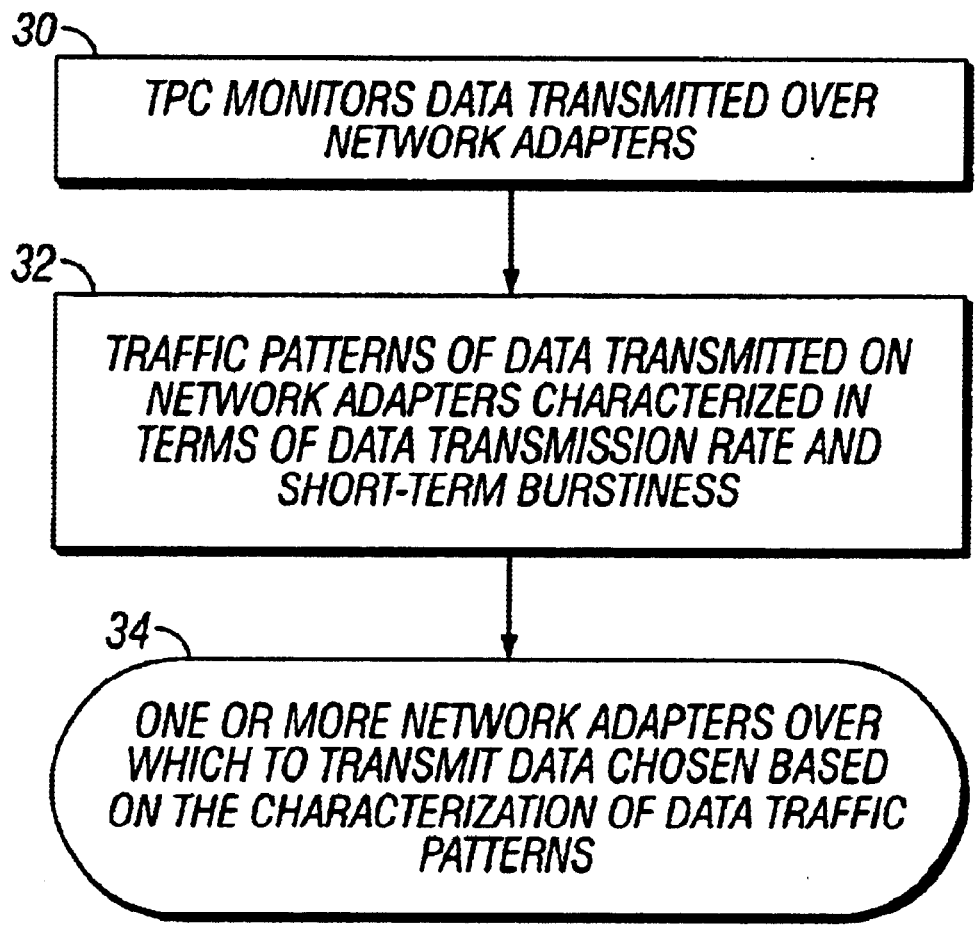
FIG. 4 is a flow chart of a method for balancing data traffic transmission according to an implementation of the invention.

FIG. 4 is a flow chart of a method of operation for server 10. The traffic patterns of data transmitted from a server 10 on one or more network adapters 11 are monitored 30. The traffic patterns are characterized 32 in terms of their average data transmission rate and their short-term burstiness. One or more network adapters 11 are chosen 34 for transmission based on the characterization of the data traffic patterns.

Figure 5:
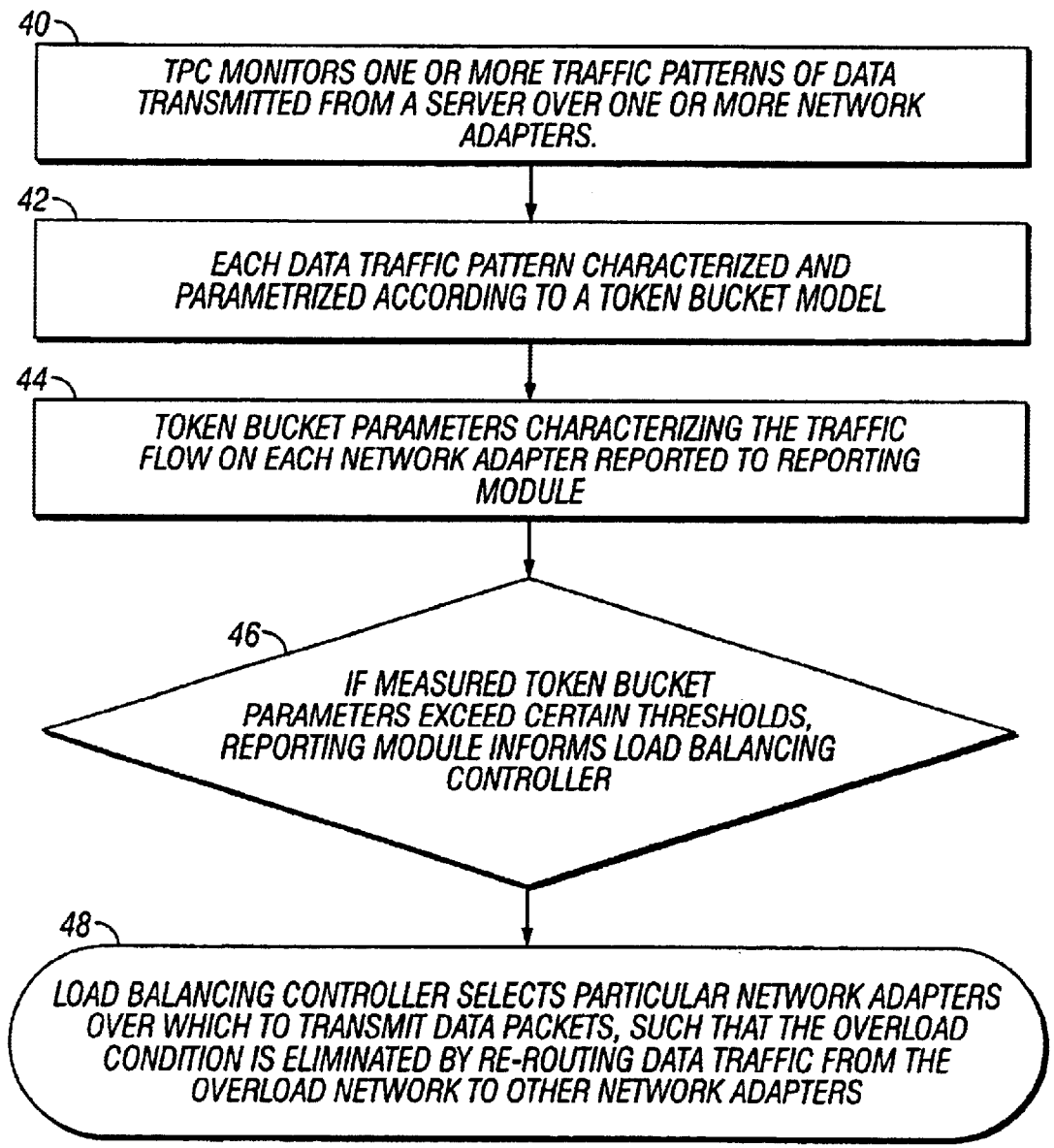
FIG. 5 is a flow chart of a method for balancing data traffic transmission according to an implementation of the invention.

FIG. 5 is a flow chart illustrating additional details of an implementation of the method illustrated in FIG. 4. A TPC 20 monitors 40 one or more traffic pattern of data transmitted from a server 10 on one or more network adapters 11. Each data traffic pattern transmitted over a network adapter 11 is characterized and parameterized 42 according to a token bucket model. Token bucket parameters characterizing the traffic flow on each network adapter 11 are reported 44 to reporting module 24. If measured token bucket parameters exceed certain thresholds, reporting module 24 informs 46 load balancing controller 26 of a critical condition on a network adapter 11. Load balancing controller 26 selects 48 particular network adapters over which to transmit data packets, such that the critical condition is eliminated by re-routing data traffic from the network adapter 11 with the critical condition to other network adapters 11. Instructions for causing server 10 to implement the operations described in the flow charts of FIGS. 3 and 4 can be stored in the memory of server 10 or in another computer readable medium from which they may be read and executed to cause server 10 to implement the foregoing.

Referring again to FIG. 3, if one network adapter 11 fails, the associated TPC 20 may report to load balancing controller 26 the inability of the network adapter 11 to transmit data. In response to the report, load balancing controller 26 causes server 10 not to route any data traffic over the failed network adapter 11, but rather to transmit data traffic only over functional network adapters 11.

The traffic patterns of both the incoming and outgoing data traffic transmitted on duplex link network adapter 11a may be monitored by a TPC 20 and characterized in terms of token bucket parameters by MBTS computing engine 22. The token bucket parameters characterizing the combined incoming and outgoing data traffic transmitted over duplex link 11a then can be compared to threshold values by reporting module 24, which can report a critical condition to load balancing controller 26 if certain threshold values are exceeded by the token bucket parameters. If a critical condition due to the combined incoming and outgoing data traffic on duplex link 11a exists, load balancing controller may cause server 10 to select network adapters 11b other than duplex link 11a over which to transmit data packets, such that the critical condition on duplex link 11a is eliminated and the data traffic load is balanced among the network adapters 11.

Other implementations are within the scope of the following claims.

What is claimed is:

1. A method comprising:
monitoring a transmission of data packets through one of multiple ports of a server coupled to a traffic source;
characterizing the monitored transmission of data packets in accordance with a token bucket model;
generating a first parameter value characterizing fluctuations in a transmission rate of data through the port relative to a transmission rate for the monitored transmission of data packets, wherein the first parameter value is generated based on the monitoring of the transmission of data packet 5, wherein the first parameter value characterizes a size of the fluctuations relative to an average transmission rate for the monitored transmission, and wherein said generating the first parameter value comprises determining a token bucket size for the monitored transmission of data packets;
generating a second parameter value characterizing an average data transmission rate of data through the port for the monitored transmission, wherein said generating the second parameter value comprises determining a token bucket rate for the monitored transmission of data packets; and
allocating data packets in said transmission from the traffic source to at least one other port for transmission based on the first parameter value and the second parameter value, wherein the allocating of data packets is accomplished within the server.

2. The method of claim 1, further comprising allocating data packets from the traffic source for transmission such that the rate at which data are transmitted through each of the multiple ports is lower than a predetermined upper bound.

3. A method of comprising:
monitoring transmissions of data packets through multiple ports of a server coupled to a traffic source;

characterizing the transmissions in accordance with a token bucket model;

generating respective first parameter values characterizing respective fluctuations in respective data transmission rates of data through respective ports relative to respective transmission rates for each of the monitored transmissions of data packets, wherein the respective first parameter values are generated based on the monitoring of the respective transmission, wherein the respective first parameter values characterize respective sizes of fluctuations in respective transmission rates of data through a respective port relative to respective average transmission rates for each of the monitored transmissions of data packets, and wherein generating the respective first parameter values comprises determining respective token bucket sizes for each of the monitored transmissions of data packets;

generating respective second parameter values characterizing respective average data transmission rates of data through a respective port for each of the monitored transmissions of data packets, wherein said generating the respective second parameter values comprises determining respective token bucket rates for each of the monitored transmissions of data packets; and allocating outgoing data packets in said monitored transmissions from the server among the multiple ports for transmission based on the respective first parameter values and the respective second parameter values, wherein the allocating of outgoing data packets is accomplished within the server.

4. The method of claim 3, further comprising:

allocating data packets from the traffic source among the multiple ports for transmission such that the rate at which data are transmitted through each of the multiple ports is lower than a predetermined upper bound.

5. A method comprising:

monitoring a transmission of data packets through one of multiple ports of a server coupled to a traffic source;

characterizing the monitored transmission of data packets in accordance with a token bucket model;

generating a first parameter value characterizing a first data transmission rate of data through the port for the monitored transmission, the first data transmission rate being averaged over a first duration of time, wherein the first parameter value is generated based on the monitoring of the transmission, and wherein said generating the first parameter value comprises determining a token bucket size for the monitored transmission of data packets;

generating a second parameter value characterizing a second data transmission rate of data through the port for the monitored transmission, the second data transmission rate being averaged over a second duration of time, the second duration of time being shorter than the first duration of time, wherein said generating the second parameter value comprises determining a token bucket rate for the monitored transmission of data packets; and allocating outgoing data packets in said transmission from the server to at least one other port for transmission based on the first parameter value and the second parameter value, wherein said allocating the data packets is accomplished within the server.

6. The method of claim 5, further comprising allocating data packets for transmission such that the rate at which data are transmitted through each of the multiple ports is lower than a predetermined upper bound.

7. An apparatus comprising:

a traffic source coupled to multiple ports of a server;

a collector configured to monitor transmissions of data packets through multiple ports, wherein the monitored transmissions of data packets are characterized in accordance with a token bucket model;

an engine configured to generate respective first parameter values characterizing respective fluctuations in respective data transmission rates of data through a port relative to respective data packets, wherein the first parameter value is generated based on the monitoring of transmissions, wherein respective first parameter values characterize respective sizes of fluctuations in respective data transmission rates of data through a respective port relative to respective average transmission rates for each of the monitored transmissions, wherein the engine is further configured to generate respective second parameter values characterizing respective average data transmission rates of data through a respective port for each of the monitored transmissions of data packets, and wherein the engine is further configured to determine respective token bucket sizes for each of the monitored transmissions of data packets and to determine respective token bucket rates for each of the monitored transmissions of data packets; and a controller within the server, the controller configured to allocate outgoing data packets in said transmission from the server among the multiple ports for transmission based on the respective first parameter values, and the controller is further configured to allocate data packets from the traffic source among the multiple ports for transmission based on the respective first parameter values, and the respective second parameter values.

8. The apparatus of claim 7, wherein the controller is further configured to allocate data packets among the multiple ports for transmission such that the rate at which data are transmitted through each of the ports is lower than a predetermined upper bound.

9. An apparatus comprising:

a traffic source coupled to multiple ports of a server;

a collector configured to monitor a transmission of data packets through one of the multiple ports, wherein the monitored transmission of data packets is characterized in accordance with a token bucket model;

an engine configured to generate a first parameter value based on the monitoring of transmission, the first parameter value characterizing a first data transmission rate of data through the port for the monitored transmission, the first data transmission rate being averaged over a first duration of time, and to generate a second parameter value characterizing a second data transmission rate of data through the port for the monitored transmission, the second data transmission rate being averaged over a second duration of time, the second duration of time being shorter than the first duration of time, and wherein the engine is further configured to determine a token bucket size and a token bucket rate for the monitored transmission of data packets; and a controller within the server, the controller configured to allocate outgoing data packets in said transmission from the server to at least one other port for transmission based on the first parameter value and the second parameter value.

10. The apparatus of claim 9, wherein the controller is further configured to allocate data packets from the traffic source for transmission such that the rate at which data are transmitted through each of the multiple ports is lower than a predetermined upper bound.

11. An apparatus comprising:
a traffic source coupled to multiple ports of a server;
a collector configured to monitor transmissions of data packets through the multiple ports;
an engine configured to:
generate respective first parameter values based on the monitored transmission of data packets, the respective first parameter values characterizing respective first data transmission rates of data through a port for each of the monitored transmissions, the first data transmission rates being averaged over respective first durations of time, and
generate respective second parameter values characterizing respective second data transmission rates of data through a port for each of the monitored transmissions, the second data transmission rates being averaged over respective second durations of time, the respective second durations of time being shorter than the respective first durations of time; and
a controller within the server, the controller configured to allocate outgoing data packets in said transmissions from the server to at least one other port for transmission based on the respective first parameter values and the respective second parameter values;
wherein the transmissions are characterized in accordance with a token bucket model; and the engine is further configured to determine respective token bucket sizes for each of the monitored transmissions of data packets and to determine respective token bucket rates for each of the monitored transmissions of data packets.

12. The apparatus of claim 11, wherein the controller is further configured to allocate data packets for transmission such that the rate at which data are transmitted through each of the multiple ports is lower than a predetermined upper bound.

13. A system comprising:
at least four ports;
a traffic source coupled with the ports of a server;
a collector configured to monitor transmissions of data packets through the ports, wherein the monitored transmissions of data packets are characterized in accordance with a token bucket model;
an engine configured to generate respective first parameter values characterizing respective fluctuations in respective data transmission rates of data through a port relative to respective transmission rates for each of the monitored transmissions of data packets, wherein the first parameter value is generated based on the monitoring of transmissions, wherein respective first parameter values characterize respective sizes of fluctuations in respective data transmission rates of data through a respective port relative to respective average transmission rates for each of the monitored transmissions, wherein the engine is further configured to generate respective second parameter values characterizing respective average data transmission rates of data through a respective port for each of the monitored transmissions of data packets, and wherein the engine is further configured to determine respective token bucket sizes for each of the monitored transmissions of data packets and to determine respective taken bucket rates for each of the monitored transmissions of data packets; and a controller within the server, the controller configured to allocate outgoing data packets in said transmission from the server among the ports for transmission based on the respective first parameter values, and the controller is further configured to allocate data packets from the traffic source among the ports for transmission based on the respective first parameter values and the respective second parameter values.

14. The system of claim 13, wherein the controller is further configured to allocate data packets among the ports for transmission such that the rate at which data are transmitted through each of the ports is lower than a predetermined upper bound.

15. A system comprising:
at least four ports;
a traffic source coupled to the ports of a server;
a collector configured to monitor a transmission of data packets through one of the ports, wherein the monitored transmission of data packets is characterized in accordance with a token bucket model;
an engine configured to generate a first parameter value based on the monitoring of transmission, the first parameter value characterizing a first data transmission rate of data through the port for the monitored transmission, the first data transmission rate being averaged over a first duration of time, and to generate a second parameter value characterizing a second data transmission rate of data through the port for the monitored transmission, the second data transmission rate being averaged over a second duration of time, the second duration of time being shorter than the first duration of time, and wherein the engine is further configured to determine a token bucket size and a token bucket rate for the monitored transmission of data packets; and
a controller within the server, the controller configured to allocate outgoing data packets in said transmission from the server to at least one other port for transmission based on the first parameter value and the second parameter value.

16. The system of claim 15, wherein the controller is further configured to allocate data packets from the traffic source for transmission such that the rate at which data are transmitted through each of the ports is lower than a predetermined upper bound.

17. An article comprising a computer-readable medium storing instructions for causing a traffic source having multiple ports for transmitting data packets to perform operations comprising:
monitoring a transmission of data packets through one of multiple ports of a server coupled to a traffic source;
characterizing the monitored transmission of data packets in accordance with a token bucket model;
generating a first parameter value characterizing fluctuations in a transmission rate of data through the port relative to a transmission rate for the monitored transmission of data packets, wherein the first parameter value is generated based on the monitoring of the transmission of data packets, wherein the first parameter value characterizes a size of the fluctuations relative to an average transmission rate for the monitored transmission, and wherein generating the first parameter value comprises determining a token bucket size for the monitored transmission of data packets;
generating a second parameter value characterizing an average data transmission rate of data through the port for the monitored transmission, wherein generating the second parameter value comprises determining a token bucket rate for the monitored transmission of data packets; and allocating data packets in said transmission from the traffic source to at least one other port for transmission based on the first parameter value and the second parameter value, wherein the allocating of data packets is accomplished within the server.

18. The article of claim 17, wherein allocating data packets comprises allocating data packets from the traffic source for transmission such that the rate at which data are transmitted through each of the multiple ports is lower than a predetermined upper bound.

19. An article comprising a computer-readable medium storing instructions for causing a traffic source having multiple ports for transmitting data packets to perform operations comprising:

monitoring a transmission of data packets through one of multiple ports of a server coupled to a traffic source;

characterizing the monitored transmission of data packets in accordance with a token bucket model;

generating a first parameter value characterizing a first data transmission rate of data through the port for the monitored transmission, the first data transmission rate being averaged over a first duration of time, wherein the first parameter value is generated based on the monitoring of the transmission, and wherein generating the first parameter value comprises determining a token bucket size for the monitored transmission of data packets;

generating a second parameter value characterizing a second data transmission rate of data through the port for the monitored transmission, the second data transmission rate being averaged over a second duration of time, the second duration of time being shorter than the first duration of time, wherein generating the second parameter value comprise determining a token bucket rate for the monitored transmission of data packets; and allocating outgoing data packets in said transmission from the server to at least one other port for transmission based on the first parameter value and the second parameter value, wherein allocating the data packets is accomplished within the server.

20. The article of claim 19, wherein allocating outgoing data packets comprise allocating data packets for transmission such that the rate at which data are transmitted through each of the multiple ports is lower than a predetermined upper bound.

* * * * *